United States Patent [19]
Van Brunt

[11] 3,931,756
[45] Jan. 13, 1976

[54] FILTER AREA LIMITING DEVICE FOR DRIP COFFEE MAKERS WITH MICROPORE FILTER

[76] Inventor: George H. Van Brunt, 1149 El Monte Drive, Thousand Oaks, Calif. 91360

[22] Filed: Apr. 18, 1974

[21] Appl. No.: 461,943

Related U.S. Application Data
[63] Continuation-in-part of Ser. No. 286,098, Sept. 5, 1972, abandoned, which is a continuation-in-part of Ser. No. 48,028, June 2, 1970, Pat. No. 3,695,168.

[52] U.S. Cl. ................................ 99/306; 99/299
[51] Int. Cl.[2] ..................... A47J 31/10; A47J 31/06
[58] Field of Search...... 99/306, 289, 295, 298–299, 99/300–301, 304–305; 259/DIG. 46

[56] References Cited
UNITED STATES PATENTS

| | | | |
|---|---|---|---|
| 203,179 | 4/1878 | Miller | 99/299 |
| 1,681,656 | 8/1928 | Biette | 99/306 |
| 1,983,142 | 12/1934 | Moriya | 99/306 |
| 2,000,309 | 5/1935 | Wentorf | 99/306 |
| 2,111,777 | 3/1938 | Hois | 99/304 UX |
| 3,361,052 | 1/1968 | Weber | 99/299 |

Primary Examiner—Edward L. Roberts
Assistant Examiner—Arthur O. Henderson
Attorney, Agent, or Firm—Allan M. Shapiro

[57] ABSTRACT

Drip coffee makers now available cannot brew good quality coffee infusions in a smaller quantity than the nominal capacity for which the coffee maker was designed. This application discloses a selectively utilized filter area limiting device disposed within the brewing chamber of a drip coffee maker with micropore filter which permits brewing an optimum aqueous coffee infusion in lesser quantity than the nominal capacity of the drip coffee maker. This is accomplished by sealing off a portion of the outlet filter and, thus limiting its effective usable area. By limiting the liquid flow through the filter to a pre-selected level, it becomes possible to maintain the total time of flow within the desired limits of an optimum coffee brewing cycle regardless of the number of cups desired.

9 Claims, 9 Drawing Figures

U.S. Patent  Jan. 13, 1976  3,931,756
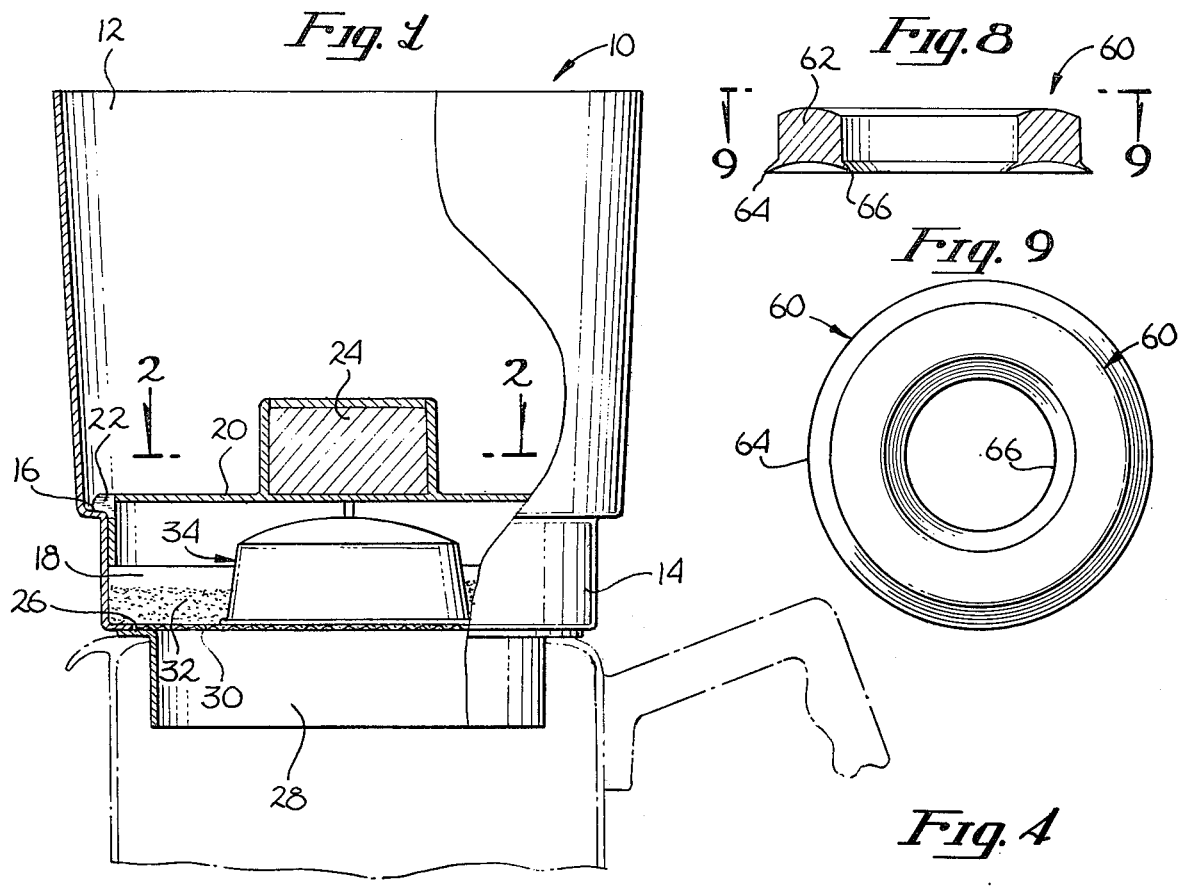
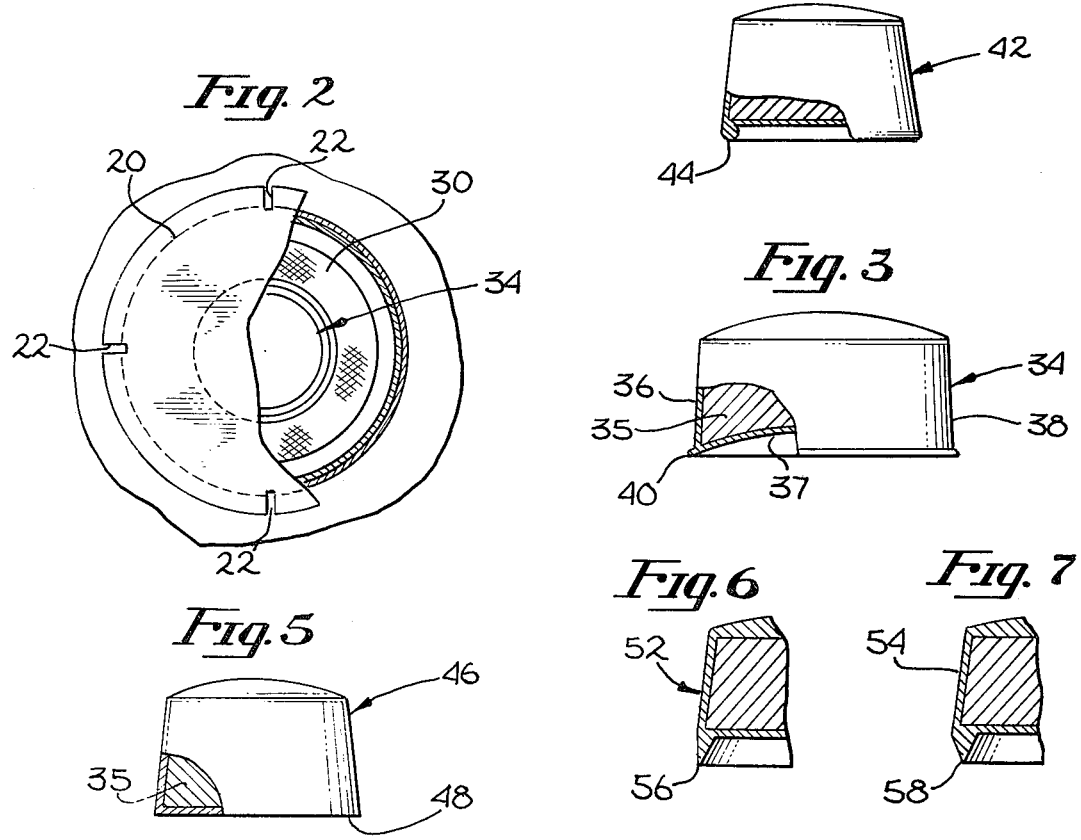

FILTER AREA LIMITING DEVICE FOR DRIP COFFEE MAKERS WITH MICROPORE FILTER

CROSS REFERENCES

This application is a continuation-in-part of co-pending patent application Ser. No. 286,098, filed Sept. 5, 1972 now abandoned for "Coffee Maker", which is a continuation-in-part of then co-pending patent application Ser. No. 48,028, filed June 2, 1970 for "Drip Coffee Maker", now U.S. Pat. No. 3,695,168.

BACKGROUND OF THE INVENTION

1. Field of the Invention

This invention is directed to a selectively utilized filter area limiting device for drip coffee makers with a micro-pore filter. The limiting device seals off and, thus, limits the effective usable area of the outlet filter.

2. Description of the Prior Art

The two most popular home coffee-making methods in general use today are the coffee percolation method and the drip coffee method. The conventional, prior art with respect to both of these methods is discussed in detail in U.S. Pat. No. 3,695,168 identified in the cross reference above.

SUMMARY OF THE INVENTION

In order to aid in the understanding of this invention, it can be stated in essentially summary form that it is directed to a filter area limiting device for sealing off and, thus, limiting the effective usable area of a drip coffee maker outlet filter which is selectively useful to permit the coffee maker to brew good quality coffee infusion in a smaller quantity than the nominal capacity for which the coffee maker was designed. The coffee makers in general use today, with all their faults, only approach producing an acceptable coffee infusion when brewing the full nominal capacity of the coffee maker. Making smaller amounts results in weak, inferior brew. By contrast, the coffee maker of the referenced patent can, by employing selectively utilizable filter area limiting devices of various sizes in accordance with the present invention, brew the full capacity of the coffee maker or any designated lesser amount for the same total brewing time. As an example, six cups of coffee infusion can be brewed in a total of three minutes with the use of a properly sized limiting device just the same as the full eight cup capacity can be brewed in three minutes without the use of the limiting device.

Accordingly, it is an object of this invention to provide a selectively utilizable filter area limiting device for drip coffee makers to permit brewing optimum coffee infusions in quantities less than the nominal total capacity of the coffee maker. Another object of this invention is for the filter area limiting device to provide, by virtue of the specific design configurations and shapes herein described, an effective seal-off of a section of the filter area preventing the passage of coffee brew through the sealed-off filter area, thus providing the control of coffee brew flow time required in an optimum quality coffee brewing method. It is a further object that the limiting device be simple and inexpensive, and of a design permitting its fabrication from injection-moldable polymer composition material resistant to coffee acids. Another object is that the device in some of the possible design configurations can contain a weight to augment the sealing effect and prevent undesired movement or displacement of the device in the coffee brewing chamber.

The features of the present invention which are believed to be novel are set forthwith particularity in the appended claims. The present invention, both as to its organization and manner of operation, together with further objects and advantages thereof, may be understood best by reference to the following description, taken in connection with the accompanying drawings.

BRIEF DESCRIPTION OF THE DRAWINGS

FIG. 1 is a side elevational side view, with parts broken away and parts shown in section, of a drip coffee maker employing a filter area-limiting device in accordance with this invention.

FIG. 2 is a partial plan view on reduced scale taken generally along the line 2—2 of FIG. 1, with parts broken away and other parts shown in section.

FIG. 3 is a side elevational view, with parts broken away, of the form of filter area-limiting device in accordance with this invention as shown in FIGS. 1 and 2.

FIGS. 4 to 8, inclusive, are side elevational view, partly broken away and sectioned, of modified forms of a filter area-limiting device in accordance with this invention.

FIG. 9 is a top plan view of the form shown in FIG. 8, as seen generally along the line 9—9 of FIG. 8.

DESCRIPTION OF THE PREFERRED EMBODIMENTS

The criticality of providing the correct inlet of water into a coffee-brewing chamber, and the correct outlet infusion in a drip coffee maker utilizing a micropore filter, is discussed in detail in the above-identified cross referenced patent, the entire disclosure of which is incorporated herein by this reference. That disclosure of a coffee maker discusses the manner in which the control of flow of liquid into and out of the coffee-brewing chamber provides the control of the drip coffee maker. The control of flow, particularly the turbulence of hot water inlet into the coffee-brewing chamber and the flow from the outlet filter, are discussed. A coffee maker of particular design has a particular nominal capacity, at which it makes the optimum flavored brew. The coffee maker of the referenced patent can be sized equally well to provide a one-cup or eight-cup nominal capacity, or any other chosen capacity.

Referring to FIG. 1 herein, a large capacity version of the coffee maker of the referenced patent is generally indicated at 10. Coffee maker 10 has an open-topped upper chamber 12 which serves as the water chamber into which hot water is poured. It is from the upper water chamber 12 that the water moves into the brewing chamber. The upper chamber 12 is formed with a substantial top opening so that water can easily poured therein.

Internally formed with upper chamber 12 is downwardly-extending tube 14, which is of slightly smaller diameter than the lower portion of the upper chamber 12 to define shoulder 16. Coffee-brewing chamber 18 is located within tube 14. The water inlet flow controller 20 rests on shoulder 16 and has four slots 22 cut in the edge to permit water to pass from the upper chamber 12 into coffee-brewing chamber 18. Conveniently, flow controller 20 has a weight 24 built therein to prevent the flow controller from floating or lifting out of position, although this function could also be accomplished by a friction fit of the flange of flow controller 20, by the use of latching mechanism, or other suitable holding devices.

At its lower end, tube 14 is turned in at inwardly-directed flange 26. Downwardly-directed skirt 28 depends from flange 26. Micropore filter 30 is secured on flange 26 and defines the bottom of coffee-brewing chamber 18. Coffee grounds 32 rest against the micropore filter 30. Each of these elements finds its counterpart in the referenced patent, and attention is called thereto for the critical details and related functions.

In the operation of a coffee maker, it is a distinct advantage to be able to make less cups of coffee than the full, or nominal, capacity of the coffee maker, and yet have the water in contact with the coffee grounds the optimum amount of time for providing good, full-bodied coffee brew. Brewing time is critical. This invention is directed to a limiting device for sealing off a portion of the effective usable area of the outlet filter so that the reduced filter area remaining effective is exactly correct for producing a reduced amount of coffee brew in the proper period of brewing time. For example, with the coffee maker 10 designed to produce a nominal eight cups of optimum coffee, the installation of one size of limiting device on the micropore filter 30 for reduction of the working area thereof permits the nominal eight-cup coffee maker to make only six cups of coffee in the same total elapsed time as for the full nominal capacity. Larger limiting device can be provided to further limit the available usable filter area so that five cups, four cups or any other desired number of cups can be made within the same time required for the full proper brewing cycle.

The first form of the limiting device of this invention, for use with a coffee maker 10, is generally indicated at 34 in FIGS. 1, 2, and 3. In its preferred form, it comprises a weight 35, preferably of metal, surrounded by a protective and decorative layer 36, preferably of injection-moldable polymer composition material. Limiting device 34 has a concave bottom 37 and upright outer surface 38. The edges of the concave bottom 37 extend outwardly beyond the outer walls of the protective cover to form an annular seal edge 40 slightly beyond the outer circumference of the main body of the device 34. Device 34 is shown in place in FIGS. 1 and 2, wherein it is placed directly upon micropore filter 30 and effectively seals off the covered portion from both coffee grinds and water so that only the uncovered portion of the micropore filter is available for passing the coffee infusion, thus limiting the filter area to just the uncovered portion. In accomplishing the sealing function, it should be noted that the seal edge 40 provides force concentration for an improved sealing effect in that the sealing pressure is greatly enhanced. The unobvious advantages of the increased or enhanced edge sealing pressure effect will be appreciated more readily when it is understood that micropore filter material is rarely perfectly flat and has a normal tendency to deflect slightly under stress, so that the edge seal of the device of this invention assures the effectivity of the filter area limiting function. It can be understood that all the shapes shown for the filter area limiters can be fabricated by machining, casting, or molding, and utilizing any suitable material.

FIG. 4 shows a second embodiment 42 of the limiting device. Again, in its preferred form, it is a weight with a protective layer and upright outer surface, but this time there is an annular seal edge 44 at the periphery of the bottom of the device 42. The annular seal edge 44 has a rounded, exposed edge, shaped like an O-ring, for sealing against the micropore filter 30.

FIG. 5 illustrates the third embodiment 46 of the limiting device. Again, in its preferred form, the device 46 is a weight 35 covered with a protective layer and having an upright outer surface. This time, the weight and the protective layer offer a flat bottom 48 which, when resting on the micropore filter, creates an edge seal effect due to the slight bowing deflection of the filter under stress.

FIGS. 6 and 7, respectively, illustrate fourth and fifth embodiments 52 and 54 of the limiting device. Again, in their preferred form these devices are weights covered with protective layers and having upright outer surfaces. In these cases, downwardly-extending sharp annular seal edges 56 and 58 are respectively provided.

FIGS. 8 and 9 illustrate another embodiment 60 of the limiting device especially useful when a limiter for brewing one single cup of coffee is desired. The embodiment 60 is, in its preferred form, an annular weight 62, again covered on all sides with a protective and decorative layer and having upright outer surfaces. Inner and outer concentric annular seal edges 64 and 66 of flat, rounded, concave or sharp edged configuration are engagable with the filter 30 to seal thereagainst.

In use, a limiting device of appropriate size is selected, in accordance with the nominal capacity of the coffee maker 10, and in view of the desired number of cups of coffee brew desired. The limiting device is placed upon the filter, and the coffee is poured therearound, and therein if an annular device 60 is used. Thereupon, the water inlet flow controller is placed in position, and water is poured into the upper chamber 12. The appropriate number of cups is brewed.

A generously sized, easily handled filter-area limiting device is preferred which has enough inherent weight to augment sealing and to prevent undesirable movement or displacement of the limiting device in the coffee crewing chamber. On the other hand, the use of sealing weight may be eliminated if desired by shaping the limiting device in a different manner and adapting it to be held down on the filter by other means.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A drip coffee maker for the brewing of a coffee infusion in quantity less than the nominal capacity of the drip coffee maker from coffee ground to at least as fine as drip grind coffee standards comprising:
   a coffee-brewing chamber for the containment of coffee ground to at least as drip grind coffee standards;
   an opening in the bottom of said coffee-brewing chamber, said opening being closed by an unsupported flexible micropore outlet filter, said filter having outlet openings of about 25 microns so as to substantially prevent passage of visible coffee sediment from said brewing chamber but to permit the passage of water-extracted coffee infusion therethrough;

water inlet flow control means in the top of said chamber, said flow control means having a plurality of inlet opening of such size and quantity as both to direct and control the inflow of water into said brewing chamber so that the water flow to the grounds in said chamber is controlled to prevent turbulent lifting of all the grounds from said outlet filter, thus preventing fine sediment from settling on and plugging the micropore outlet openings as the coffee infusion passes through the filter so that the length of coffee-brewing time is consistent and uniform.

said flow control means being so positioned relative to the grounds in said chamber, and said inlet openings being of said size and quantity, also to control the upward venting outflow of gases therethrough in such a manner as to limit inflow of water until the coffee grounds are wetted and then to prevent entrapment of gases by freely venting such gases therethrough to ensure steady inflow of water into said brewing chamber with respect to the outflow of water-extracted coffee infusion through said micropore outlet filter during brewing; and a filter area limiting device selectively positionable on said micropore filter to seal off a portion of said filter so as to limit the effective usable area of said filter so that the remaining area of said micropore filter exposed in said coffee-brewing chamber is appropriate for brewing a lesser amount of the coffee infusion than the nominal capacity of the drip coffee maker in the same total time of liquid flow.

2. The drip coffee maker of claim 1 wherein said filter area limiting device has a bottom surface shaped to provide force concentration along the peripheral edge of said bottom surface against said micropore filter to provide an edge seal on said filter.

3. The drip coffee maker of claim 2 wherein said limiting device includes a weight portion to increase such force concentration.

4. The drip coffee maker of claim 3 wherein said edge seal against said filter is annular.

5. The drip coffee maker of claim 4 wherein said limiting device has concave bottom surface.

6. The drip coffee maker of claim 3 wherein said bottom surface of said limiting device forms concentric annular edge seals against said filter.

7. The drip coffee maker of claim 2 wherein said peripheral edge of said bottom surface is downturned.

8. The drip coffee maker of claim 7 wherein said downturned edge is a rounded bead in section.

9. The drip coffee maker of claim 7 wherein said downturned edge is tapered to a sharp annular ridge.

* * * * *